(12) United States Patent
Cooper (10) Patent No.: US 10,318,849 B2
(45) Date of Patent: Jun. 11, 2019

(54) CHECK IMAGE DATA INTERFERENCE PROCESSING

(71) Applicant: NCR Corporation, Duluth, GA (US)

(72) Inventor: Jeffrey Stephen Cooper, Kitchener (CA)

(73) Assignee: NCR Corporation, Atlanta, GA (US)

( * ) Notice: Subject to any disclaimer, the term of this patent is extended or adjusted under 35 U.S.C. 154(b) by 16 days.

(21) Appl. No.: 14/725,253

(22) Filed: May 29, 2015

(65) Prior Publication Data

US 2016/0350590 A1 Dec. 1, 2016

(51) Int. Cl.
*G06K 9/03* (2006.01)
*G06K 9/72* (2006.01)

(52) U.S. Cl.
CPC .............. *G06K 9/72* (2013.01); *G06K 9/03* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 5,668,897 A * | 9/1997 | Stolfo | ............... | G06F 17/30247 382/283 |
| 6,233,340 B1 * | 5/2001 | Sandru | ................ | G06Q 20/04 283/17 |
| 7,107,528 B2 * | 9/2006 | Gerstl | ................... | G06F 17/243 715/261 |
| 7,729,990 B2 * | 6/2010 | Marceau | ............... | G06Q 20/04 705/35 |
| 7,840,891 B1 * | 11/2010 | Yu | .......................... | G06F 17/243 715/223 |
| 8,625,886 B2 * | 1/2014 | Bart | .................... | G06K 9/00442 382/155 |
| 8,837,806 B1 * | 9/2014 | Ethington | .......... | G06Q 20/0425 382/140 |
| 9,038,889 B2 * | 5/2015 | Johnson | ............... | G06Q 20/108 235/379 |
| 9,619,701 B2 * | 4/2017 | Ragnet | ............... | G06K 9/00463 |
| 2004/0089711 A1 * | 5/2004 | Sandru | ................ | G06Q 20/042 235/379 |
| 2004/0162809 A1 * | 8/2004 | Koenig | ................. | G06F 19/321 |
| 2007/0288382 A1 * | 12/2007 | Narayanan | ............. | G06Q 20/04 705/45 |

(Continued)

*Primary Examiner* — Nancy Bitar
(74) *Attorney, Agent, or Firm* — Schwegman, Lundberg & Woessner (57) ABSTRACT

Various embodiments herein each include at least one of systems, methods, and software for check image data inference processing. Another example method embodiment includes inferring a check amount of a check image included in an account group of check images stored in a memory device. Where the check amount is missing in check data associated with the check image or was poorly read by an optical character recognition process, the method includes inferring of the check amount based at least in part on one or more check amounts of check data associated with other check images of the account group. Once inferred, the method includes updating the check amount of the check data associated with the respective check image with the inferred check amount of the check image. Some embodiments also or alternatively include inferring a check date.

17 Claims, 4 Drawing Sheets

(56) References Cited

U.S. PATENT DOCUMENTS

| | | | | |
|---|---|---|---|---|
| 2009/0114716 A1* | 5/2009 | Ramachandran | .... | G06Q 20/042 235/379 |
| 2009/0285471 A1* | 11/2009 | Wall | ............ | G06K 9/00986 382/137 |
| 2014/0064618 A1* | 3/2014 | Janssen, Jr. | ........ | G06K 9/00469 382/182 |
| 2015/0117747 A1* | 4/2015 | Smith | ............ | G06K 9/00469 382/137 |
| 2015/0117748 A1* | 4/2015 | Smith | ............ | G06K 9/00469 382/137 |
| 2015/0120548 A1* | 4/2015 | Smith | ............ | G06Q 20/407 705/44 |

* cited by examiner

CHECK IMAGE DATA INTERFERENCE PROCESSING

BACKGROUND INFORMATION

Electronic check processing and in particular electronic check image processing has provided for many increased efficiencies in check writing and processing. Devices are able to image checks, check images can be electronically read, and the read data and images can be submitted for processing. However, various algorithms for reading text present on checks can be error prone, even when the particular algorithm is considered quite reliable. Poorly read data can present issues such as processing checks for amounts greater than what they are written for, processing checks with incorrect dates, drawing checks against incorrect accounts, and the like. To avoid such errors, it is common for involved systems to request manual verification of data. However, this increases the expense of such solutions and defeats many of the promises of electronic check processing.

SUMMARY

Various embodiments herein each include at least one of systems, methods, and software for check image data inference processing. For example, one method embodiment includes receiving images of a plurality of post-dated checks and performing optical character recognition on at least a portion of text included in each check image to obtain check data for each check image. This method then adds the check data to data associated with each respective check image. Subsequently, the method associates images of checks written from the same account into an account group and then, for each account group, when check data of a check image is missing or has a poorly or ambiguously read date, inference processing may be performed. The inference processing may include inferring a check date of a check image that is missing or has a poorly or ambiguously read date. The inference, in some embodiments, is based at least in part on check data associated with other check images of the account group. The inference processing continues by updating the check date of the check data associated with the respective check image with the inferred date of the check image. Once the inference processing has been performed against each check image of an account group that is missing or has a poorly or ambiguously read date, the method stores the check images and check data associated with the respective check images in a memory device.

Another example method embodiment includes inferring a check amount of a check image included in an account group of check images stored in a memory device. Where the check amount is missing in check data associated with the check image or was poorly read by an optical character recognition process, the method includes inferring of the check amount based at least in part on one or more check amounts of check data associated with other check images of the account group. Once inferred, the method includes updating the check amount of the check data associated with the respective check image with the inferred check amount of the check image. Some embodiments also or alternatively include inferring a check date.

A further embodiment is in the form of a system. The system of such embodiments includes at least one processor, at least one memory, and an instruction set accessible in the memory. The instruction set includes a set of modules that are executable by the at least one processor. The set of modules include one or both of a check amount inference module and a check date inference module.

The check amount inference module includes instructions executable by the at least one processor to perform data processing activities. The data processing activities of the check amount inference module, in some embodiments, include inferring a check amount of a check image included in an account group of check images stored in a memory device. The check amount inference module is executed against check images where the check amount is missing in check data associated with the check image or was poorly read by an optical character recognition process. The inferring of the check amount in such embodiments is based at least in part on one or more check amounts of check data associated with other check images of the account group. The data processing activities of the check amount inference module further include updating the check amount of the check data associated with the respective check image with the inferred check amount of the check image.

The check date inference module includes instructions executable by the at least one processor to perform data processing activities. The data processing activities of the check date inference module include inferring a check date of a check image included in an account group of check images stored in the memory device where the check date is missing in the check data associated with the check image or was poorly read by an optical character recognition process. The inferring of the check date in such embodiments may be based at least in part on the check data associated with the other check images of the account group. Once inferred, the check date may be updated in the check data associated with the respective check image with the inferred date of the check image.

DETAILED DESCRIPTION

Various embodiments herein each include at least one of systems, methods, and software for check image data inference processing. The various embodiments herein are generally directed to processing groups of checks drawn from the same account for the same purpose, such as installment payments. Examples of installment payments can be with regard to a lease, a mortgage, a loan, a cost-leveled utility payment, a fixed-cost service bill, and the like. In a typical embodiment, many checks are imaged and processed in one batch. The images of the checks are then processed. The processing includes performing Optical Character Recognition (OCR) against each check to read text of each check. Data read from each check, referred to herein as check data, is maintained with regard to each check image, which may include adding metadata to a data structure of each check. The OCR process, in some embodiments, includes a confidence factor with regard to data read from a check image or with regard to each item read from the check image. When an expected value, such as a check amount or check date is not read and is therefore missing, the value is read with a low confidence factor, or the value is ambiguously read (e.g., a date of Jan. 6, 2016 is potentially ambiguous as it may be unclear whether the date is January 1 or June 1), the proper value may be inferred in view of other checks written against the same account.

For example, an underlying principal of various embodiments is that a group of checks may be provided at one time by an individual or entity for a set of installment payments. Some of the group of checks will likely be post-dated in such situations, making reading of the dates and check amounts by OCR processing important to ensure a check is not submitted for payment processing before the account holder is expecting and when submitted, the check is submitted for payment processing for the correct amount. Installment payments are typically for the same amount. Further, installment payments are typically made at a consistent frequency. For example, a $100 payment made on the first of every month. Thus, some embodiments include imaging a plurality of checks. Each check image may then be submitted for OCR processing. When the checks are imaged, the imaging device may read the code line data included at the bottom of the check by a code line reader of the check imager or the code line data may be read by OCR processing. Regardless, at this point in the processing, the check code line data has been obtained. Note that the code line data includes a bank routing number, a bank account number, and may also include a check number. The check images may then be sorted into account groups based on the check code line data. The check images within an account group may also be sorted by check number as checks are typically written sequentially by date (e.g., January 1, February 1, March 1, etc.).

In such embodiments, once the checks have been grouped, and sorted, one or both of the check dates and check amounts may be considered for inference processing. The relevant check data of each check is considered, such as the check date and the check amount, depending on the inference processing to be performed in the particular embodiment. When a check date is missing or has been read ambiguously or with a low confidence level, a set of date inference rules may be considered to infer the check date with a high likelihood of accuracy. Similarly, when the check amount is missing, a set of check amount inference rules may be applied to infer the check amount with a high likelihood of accuracy.

One date inference rules may include identifying a frequency at which other checks in the relevant account group have been written, such as monthly on the same day of the month, bi-weekly, and the like. Then a gap analysis may be performed, which may identify eleven checks written for the first of every month but for one month where no check is present. In such cases, the missing month is a gap and it may be a fair inference that the check of interest was intended for the gap month. Further consideration may be made, in some embodiments, of the check number of the check of interest in view of the check numbers of the preceding and subsequent checks bordering the gap. When the check of interest properly fills a check number gap, the inference of the check date is further confirmed. Check amounts of the account group may also be compared with the check of interest and when all of the check amounts match, additional confirmation is provided. The check data of the check of interest may then be updated with the inferred date and a next check image, if any remain, may be processed.

Similarly, with regard to check amounts, when a check amount is missing in the check data or was read by the OCR processing with a low confidence, the check amount may be subjected to check amount inference processing. The check amount inference processing may similarly include grouping check images by account number and sorting by one or both of date and check number. When the check amount is missing, but the check date is within sequence of checks for all the same amount, the check amount may be inferred as being of that amount. When a check amount was read with a low confidence, the check amount may be considered in view of the amounts of other checks in the account group. When the low confidence value matches the amounts of other checks in the account group, the check amount may be inferred. When the low confidence value does not match other amounts in the account group, a distance measuring algorithm, such as the Levenshtein distance algorithm may be applied to the low confidence value and one or more other check amount values in the account group to identify a distance there between. Application of the distance measuring algorithm, in some embodiments, can account for a misread of one or more numbers of the low confidence value, such as reading a "1" instead of a "7". When the distance is within an acceptable threshold, the low confidence value may be updated. The updated values may then be stored and the check images and the associated check data are ready for submission for electronic check processing. As some checks are likely post-dated, the post-dated checks may be held until the date of the check and submitted at that time.

Such embodiments may be utilized by various entities that receive checks as payments, such as landlords, utility companies, banks, insurance companies, and the like.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
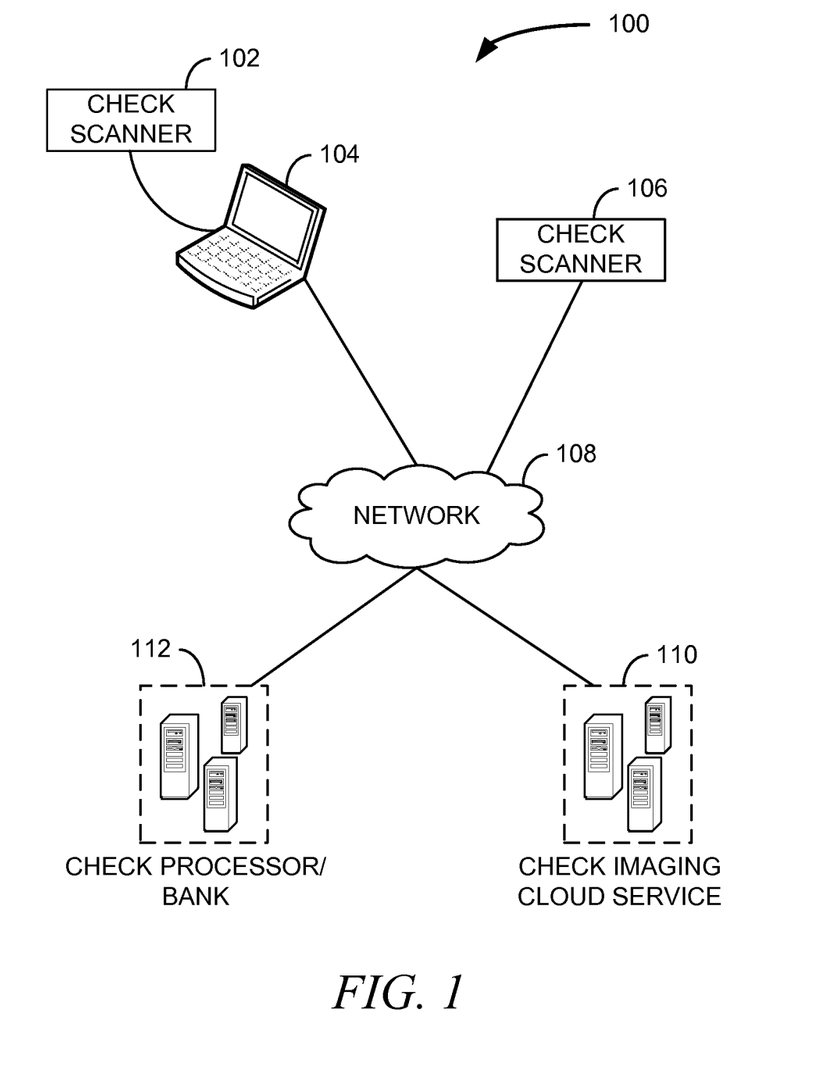
FIG. 1 is a logical block diagram of a system, according to an example embodiment.

FIG. 1 is a logical block diagram of a system 100, according to an example embodiment. In particular, FIG. 1 illustrates an architecture of the system 100 according to some embodiments. The system 100 includes a check scanner 102 coupled to a personal computer 104. The personal computer 104 is connected to a network 108, such as the Internet. Also connected to the network 108 is a standalone check scanner 106.

The check scanners 102, 106 operate to capture images of checks submitted for payments. The check scanners 102, 106 may include check code line reading capabilities, but need not. The check scanner 102 provides images of scanned checks to the personal computer 104. The personal computer 104 may perform check image data inference processing in some embodiments. However, in other embodiments, the personal computer 104 forwards the check images, and check code line data when the check scanner 102 includes check code line reading capabilities, over the network 108 to a check imaging cloud service 110. The check scanner 106 is a standalone device configured to send check images, and check code line data when the check scanner 106 includes check code line reading capabilities, over the network 108 to a check imaging cloud service 110.

The check imaging cloud service 110 operates to perform check image data inference processing with regard to check images, and check code line data when received, received from one or both of the personal computer 104 and the check scanner 106. Regardless of whether the check image data inference processing is performed by the personal computer 104 or the check imaging cloud service, the check image data inference processing is performed account to one or more of the methods described herein to infer check data with regard to check data items that are missing or are poorly or ambiguously read. In some embodiments, check images that have been read, and processed according to check image data inference processing where needed, are queued by software that executes on the personal computer 104 or by one or more processes of the check imaging cloud service 110 for submission via the network 108 to a check processor 112, such as a bank. The check processor 112 processes check images and check data for payment.

Figure 2:
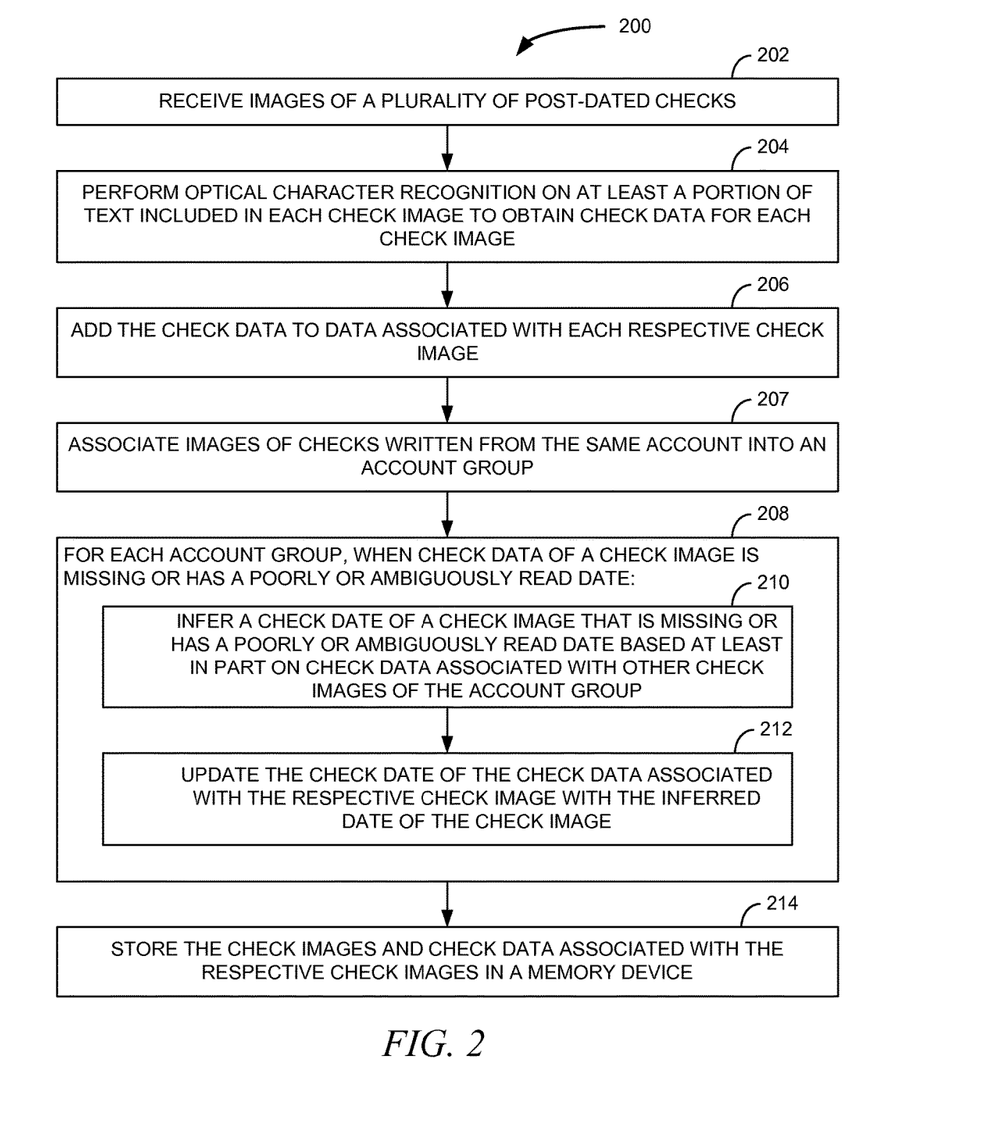
FIG. 2 is a block flow diagram of a method, according to an example embodiment.

FIG. 2 is a block flow diagram of a method 200, according to an example embodiment. The method 200 is an example of a check image data inference processing method that may be performed by the personal computer 104 or check imaging cloud service 110 of FIG. 1.

The method 200 includes receiving 202 images of a plurality of post-dated checks, such as from a check scanner coupled to a computer performing the method 200 or from a computing device or standalone check scanner via a network. The method 200 further includes performing 204 OCR on at least a portion of text included in each check image to obtain check data for each check image. The check data is then added 206 to data associated with each respective check image, which may be a table of data including rows of data each associated with a respective check image or adding the check data to a data structure of a respective check image as metadata. The method 200 continues by associating 207 images of checks written from the same account into an account group. Checks within an account group may further be sorted by one or more elements of data within a check image, such as a check number, a check date, a party identified in a payee line of the check image, and the like.

Check images in each account group may then be processed as needed. This processing may include, for each account group 208, when check data of a check image is missing or has a poorly or ambiguously read date, inferring 210 a check date based at least in part on check data associated with other check images of the account group. Once inferred, the method 200 includes updating 212 the check date of the check data associated with the respective check image with the inferred date. Once each check image of an account group has been processed, the method includes storing 214 the check images and check data associated with the respective check images in a memory device.

In some embodiments of the method 200, the images of each check are received 202 with check code line data read from a code line of each respective check, the check code line data included in check data associated with a respective check image. Further, as many checks are made out by hand, the performing 204 of the OCR on at least a portion of text included in each check image may include performing handwriting optical character recognition, in some embodiments.

With further regard to performing 204 the OCR, the OCR processing obtains a confidence value with regard to the obtained check data in some embodiments. A confidence value may be received with regard to a check image as a whole or with regard to individual data elements therein. In some embodiments in particular, a confidence value may be obtained with specific regard to at least one of a date and an amount included in the check image. The confidence value in such embodiments may be included in the check data added to data associated with the respective check image. In some such embodiments, the inferring 210 of check data with a poorly read date is performed when a confidence value of a date read from a check image is below a confidence value, such as a confidence value less than 85% or another percentage of likely accuracy.

The inferring 210 of a check date, in some embodiments, includes ordering check data of check images within the account group by at least one of check numbers and dates and identifying a frequency of check image dates. The frequency may be on a certain date every month, quarter, or other period or day therein, weekly, bi-weekly, or other frequency period. The inferring 210 of the date of the check image may then be made based at least in part on the identified frequency of check image dates. In some of these and other embodiments, an ambiguously read date includes a date read from a check where a month and day are both represented as a number less than thirteen (13). The inferring 210 of an ambiguously read date in some such embodiments may then be performed according to a set of ambiguity resolution rules. One such ambiguity resolution rule includes identifying an order of month and day represented in at least one other check image of the account group and applying that order to the ambiguously read date as the inferred date. Another ambiguity resolution rule includes when considering month/day or day/month order is a date prior to a current date, applying an order that is a future date as the inferred date. A further ambiguity resolution rule includes determining whether one of the month/day or day/month order fills a date frequency gap between dates of other check images included in the account group, and when so, applying an order that fills the date frequency gap as the inferred date. Other date ambiguity resolution rules may be included in other embodiments.

Some embodiments of the method further include inferring check amounts when the check amount is missing or has been poorly read by the OCR processing. For example, for each account group, when check data of a check image is missing or has a poorly read check amount, the method 200 may include inferring the check amount of the check image based on check values included in check data of at least one other check image of the account group. Once inferred, the method 200, in such embodiments, updates the check data check amount of the respective check image. In some such embodiments, inferring the check amount includes ordering check data of check images within the account group by at least one of check numbers and dates. Then, for check amounts in check data of the account group read by the optical character reference with a confidence level above a confidence threshold, identifying a most common check amount. These embodiments may then perform a similarity comparison between the identified most common amount and the check amount of the check image missing or having a poorly read check amount. When the similarity is within an acceptable tolerance, the method 200 modifies the check amount of the check data of the check image missing or having a poorly read check amount to be the same as the identified most common check amount. In some such embodiments, the similarity comparison is performed according to a Levenshtein distance algorithm and the acceptable tolerance is a threshold value within which an output of the Levenshtein distance algorithm must fit to infer the check amount.

Figure 3:
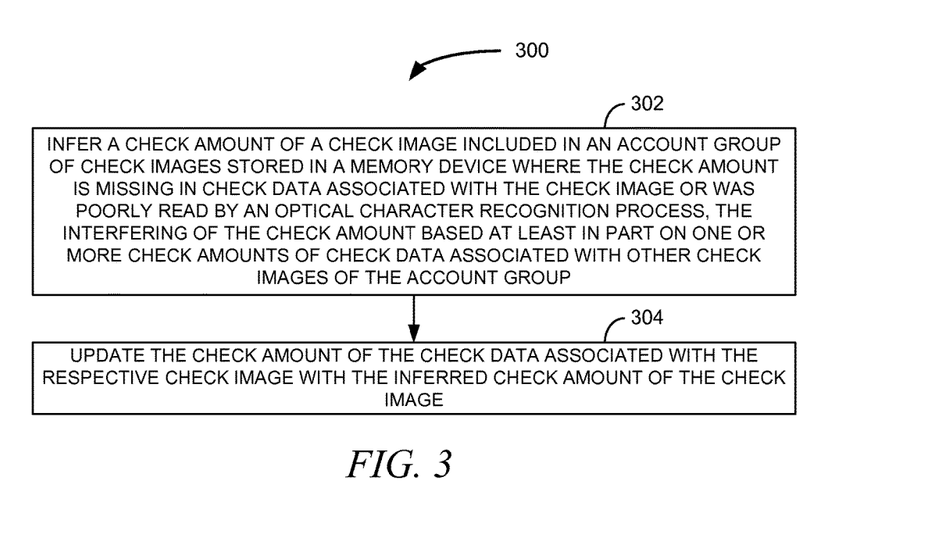
FIG. 3 is a block flow diagram of a method, according to an example embodiment.

FIG. 3 is a block flow diagram of a method 300, according to an example embodiment. The method 300 is another example of a check image data inference processing method that may be performed by the personal computer 104 or check imaging cloud service 110 of FIG. 1.

The method 300 includes inferring 302 a check amount of a check image included in an account group of check images. The check images are received from a check scanner or are relayed by a computer or other computing after being captured by a check scanner or other imaging device and are stored in a memory device. The inferring 302 of the check amount is performed with regard to check images where the check amount is missing in check data associated with the check image or was poorly read by an optical character recognition process. The inferring of the check amount is typically based at least in part on one or more check amounts of check data associated with other check images of the account group. Once the check date is inferred 302, the method 300 includes updating the check amount of the check data associated with the respective check image with the inferred check amount of the check image.

In some embodiments, the inferring 302 of the check amount of the check image missing or having a poorly read check amount includes ordering check data of check images within the account group by at least one of check numbers and dates. Then, for check amounts in check data of the account group read by an optical character recognition process with a confidence level above a confidence threshold, identifying a most common check amount. A similarity comparison may then be performed between the identified most common amount and the check amount of the check image missing or having a poorly read check amount. When the similarity is within an acceptable tolerance, the method 300 modifies the check amount of the check data of the check image missing or having a poorly read check amount to be the same as the identified most common check amount.

Another method embodiment that may be performed by the personal computer 104 or check imaging cloud service 110 of FIG. 1 includes extracting at least a portion of text included in each document image of a plurality of documents images. In various embodiments, the document images may be images of checks, invoices, shipping documents, and the like. This method also includes identifying a plurality of documents that are associated with a same account and identifying a text field in one document from which text was not be reliably extracted. The method may then infer content of the text field based on text extracted from corresponding text fields in other documents associated with the same account.

In some embodiments where the document images are check images, the check images are received with check code line data read from a code line of each respective check. The check code line data in such embodiments may be included in check data associated with a respective check image. In these and some other embodiments, the extracting of the method includes performing optical character recognition to extract a portion of text from a text field and adding the text to the check data associated with a respective check image from which the text was extracted. In some such embodiments, performing the optical character recognition further obtains a confidence value with regard to the extracted text, such as with specific regard to extracted text of at least one of a date and an amount of a check image. The confidence value may be added to check data associated with the respective check image. Then the inferring of content of the text field from which text was not reliability extracted is performed in some embodiments when triggered by a confidence value of a date or amount read from a check image below a confidence threshold.

Figure 4:
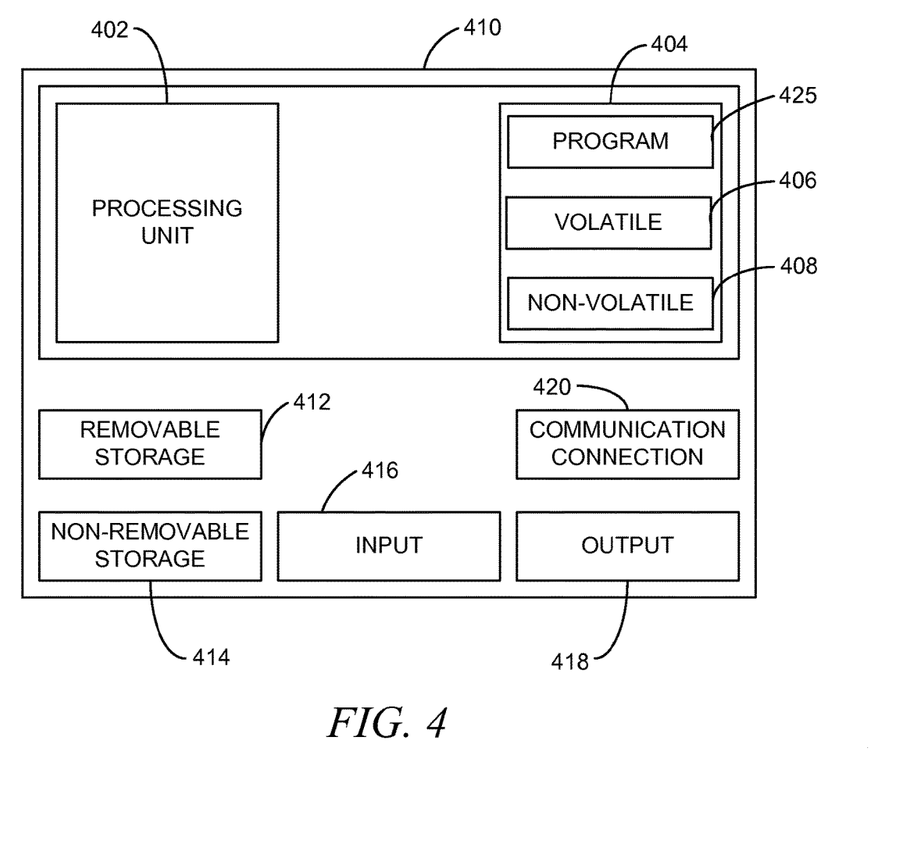
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, smartwatch, or other computing device including the same or similar elements as illustrated and described with regard to FIG. 4. Devices such as smartphones, tablets, and smartwatches are generally collectively referred to as mobile devices. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a touchscreen, touchpad, mouse, keyboard, camera, one or more device-specific buttons, one or more sensors integrated within or coupled via wired or wireless data connections to the computer 410, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   extracting, by executing instructions on a computer processor, at least a portion of text included in each digital document image of a plurality of check images and storing, on a data storage device, the extracted text as check data associated with a text field of the respective check image;
   identifying a plurality of checks in the stored check data that are associated with a same account;
   identifying a text field in the stored data of one check from which text was not reliably extracted; and
   inferring, by executing instructions on the computer processor, content of the text field based on the extracted text and on text extracted from corresponding text fields in check data of other check images associated with the same account, the inferring including a distance comparison according to a distance measuring algorithm that measures a distance between extracted text and text extracted from corresponding text fields in check data of other check images associated with the same account; and
   storing the inferred content on the data storage device.

2. The method of claim 1, wherein the check images are received with check code line data read from a code line of each respective check, the check code line data included in check data associated with a respective check image.

3. The method of claim 2, wherein the extracting includes performing optical character recognition to extract a portion of text from a text field and adding the text to the check data associated with a respective check image from which the text was extracted.

4. The method of claim 3, wherein:
   performing the optical character recognition further obtains a confidence value with regard to the extracted text, a confidence value obtained with specific regard to extracted text of at least one of a date and an amount of a check image, the confidence value added to check data associated with the respective check image; and
   the inferring of content of the text field from which text was not reliability extracted is performed when a confidence value of a date or amount read from a check image is below a confidence threshold.

5. The method of claim 4, wherein when inferring date content for a text field, the inferring of the date content includes:
   ordering the plurality of documents associated with the same account as the document from which the text field was not reliability extracted by at least one of dates and check numbers extracted from the respective documents;
   identifying a frequency of dates of the check images; and
   inferring the date content of the text field that was not reliability extracted based at least in part on the identified frequency of check image dates.

6. The method of claim 4, wherein a text field that was not reliably extracted includes an ambiguously read date, an ambiguously read date including a date extracted from a check image where a month and day are both represented as a number less than thirteen (13), the inferring of the text content of an ambiguously read date performed according to a set of ambiguity resolution rules, the ambiguity resolution rules including:
   identifying an order of month and day extracted from at least one other check image of the documents associated with the same account and applying that order to the ambiguously read date as the inferred content;
   when the ambiguously read date, when considering month/day or day/month order is a date prior to a current date, applying an order that is a future date as the inferred content; and
   when one of the month/day or day/month order fills a date frequency gap between dates of other check images associated with the same account, applying an order that fills the date frequency gap as the inferred content.

7. The method of claim 4, further comprising:
   ordering the plurality of documents associated with the same account as the document from which the text field was not reliability extracted by at least one of dates and check numbers extracted from the respective documents;
   when check data of a check image includes inferring a check amount that was not reliably extracted:
   inferring content of the check amount of the check image based on check values included in check data of at least one other check image associated with the same account as the check image from which the check amount was not reliably extracted; and updating the check data check amount of the check image from which the check amount was not reliably extracted.

8. The method of claim 7, wherein inferring the check amount based on check values included in check data of at least one other check image associated with the same account as the check image from which the check amount was not reliably extracted includes:
ordering check data of check images of the plurality of documents associated with the same account by at least one of check numbers and dates;
for check amounts in check data of the plurality of documents associated with a same account having a confidence level above a confidence threshold, identifying a most common check amount;
performing a similarity comparison between the identified most common amount and the check amount extracted from the check image with the check amount that was not reliably extracted; and
when the similarity is within an acceptable tolerance, modifying the check amount of the check data of the check image that was not reliably extracted to be the same as the identified most common check amount.

9. The method of claim 8, wherein the similarity comparison is performed according to a Levenshtein distance algorithm and the acceptable tolerance is a threshold value within which an output of the Levenshtein distance algorithm must fit to infer the check amount.

10. A method comprising:
inferring, by executing instructions on a computer processor, a check amount of a check image included in an account group of check images stored in a memory device where the check amount is missing in check data associated with the check image or was poorly read by an optical character recognition process, the inferring of the check amount based at least in part on one or more check amounts of check data associated with other check images of the account group, each stored check image including check data of text fields of the respective check images, the inferring the check amount of the check image missing or having a poorly read check amount based at least in part on one or more check amounts of check data associated with other check images of the account group includes:
ordering check data of check images within the account group by at least one of check numbers and dates;
for check amounts in check data of the account group read by an optical character recognition process with a confidence level above a confidence threshold, identifying a most common check amount;
performing a similarity comparison between the identified most common amount and the check amount of the check image missing or having a poorly read check amount, the similarity comparison including applying a distance measuring algorithm that measures a distance between extracted text and text extracted from corresponding text fields in check data of other check images associated with the same account; and
when the similarity is within an acceptable tolerance, modifying the check amount of the check data of the check image missing or having a poorly read check amount to be the same as the identified most common check amount; and
updating the check amount of the check data associated with the respective check image with the inferred check amount of the check image.

11. The method of claim 10, wherein the similarity comparison is performed according to a Levenshtein distance algorithm and the acceptable tolerance is a threshold value within which an output of the Levenshtein distance algorithm must fit to infer the check amount.

12. The method of claim 10, further comprising:
inferring a check date of the check image included in the account group of check images stored in the memory device where the check date is missing in the check data associated with the check image or was poorly read by the optical character recognition process, the inferring of the check date based at least in part on the check data associated with the other check images of the account group; and
updating the check date of the check data associated with the respective check image with the inferred date of the check image.

13. The method of claim 10, further comprising:
receiving images of a plurality of post-dated checks;
performing optical character recognition, by the optical character recognition process, on at least a portion of text included in each check image to obtain the check data for each check image;
adding the check data to data associated with each respective check image; and
associating images of checks written from the same account into an account group.

14. The method of claim 13, wherein the images of the plurality of post-dated checks are received via a network interface device.

15. A system comprising:
at least one processor;
at least one memory; and
an instruction set accessible in the memory and executable by the at least one processor, the instruction set including a set of modules, the set of modules comprising:
a check amount inference module including instructions executable by the at least one processor to perform data processing activities comprising:
inferring a check amount of a check image included in an account group of check images stored in a memory device where the check amount is missing in check data associated with the check image or was poorly read by an optical character recognition process, the inferring of the check amount based at least in part on one or more check amounts of check data associated with other check images of the account group, each stored check image including check data of text fields of the respective check images; and
updating the check amount of the check data associated with the respective check image with the inferred check amount of the check image; and
a check date inference module including instructions executable by the at least one processor to perform data processing activities comprising:
inferring a check date of the check image included in the account group of check images stored in the memory device where the check date is missing in the check data associated with the check image or was poorly read by the optical character recognition process, the inferring of the check date based on the extracted text and at least in part on the check data associated with the other check images of the account group, the inferring including a distance comparison according to a distance measuring algorithm that measures a distance between extracted text and text extracted from corresponding text fields in check data of other check images associated with the same account; and updating the check date of the check data associated with the respective check image with the inferred date of the check image.

16. The system of claim 15, the set of modules further comprising:

a check image receiving module including instructions executable by the at least one processor to perform data processing activities comprising:

receiving images of a plurality of checks;

performing optical character recognition, by the optical character recognition process, on at least a portion of text included in each check image to obtain the check data for each check image;

adding the check data to data associated with each respective check image;

associating images of checks written from the same account into an account group; and ordering check data of check images within each account group by at least one of check numbers and dates.

17. The system of claim 16, further comprising:

a network interface device; and wherein the check image receiving modules receives the image of the plurality of checks via the network interface device.

* * * * *